United States Patent
Faramarzi

(10) Patent No.: US 6,719,271 B2
(45) Date of Patent: Apr. 13, 2004

(54) COMBINATION FACE AND PLUG SEAL

(75) Inventor: Jamshid Faramarzi, Dove Canyon, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 146 days.

(21) Appl. No.: 10/198,568

(22) Filed: Jul. 18, 2002

(65) Prior Publication Data

US 2004/0011986 A1 Jan. 22, 2004

(51) Int. Cl.[7] ................................................ F16K 3/24
(52) U.S. Cl. ........................................ 251/282; 251/314
(58) Field of Search ................................ 251/281–283, 251/363, 314, 316–317.01

(56) References Cited

U.S. PATENT DOCUMENTS

| | | | | |
|---|---|---|---|---|
| 3,598,363 A | * | 8/1971 | Shaw | 251/172 |
| 3,734,457 A | * | 5/1973 | Roos | 251/173 |
| 4,671,308 A | * | 6/1987 | Williams et al. | 137/72 |
| 5,722,637 A | | 3/1998 | Faramarzi et al. | |
| 5,771,927 A | * | 6/1998 | Johansen et al. | 137/614.04 |

* cited by examiner

Primary Examiner—Paul J. Hirsch
(74) Attorney, Agent, or Firm—Stetina Brunda Garred & Brucker

(57) ABSTRACT

A combination face and plug seal for use in a balanced pressure valve having a valve housing and a valve plug movable within the valve housing between an open position and a closed position. The seal comprises a main body portion and an engagement portion integrally connected to the main body portion. The seal further comprises at least one primary spring which extends along and at least partially between the main body and engagement portions. Integrally connected to the main body portion is at least one seal leg portion, with at least one secondary spring extending along and at least partially between the main body and seal leg portions. The seal is adapted to be retained within the valve housing, with the engagement portion being forced into sealed engagement with the valve plug and the seal leg portion being forced into sealed engagement with the valve housing when the valve plug is closed or moved from the closed position toward the open position.

20 Claims, 3 Drawing Sheets

COMBINATION FACE AND PLUG SEAL

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to valve seals, and more particularly to a combination face and plug seal particularly suited for use in a pressure balanced valve.

There is currently known in the prior art balanced valves which include pressure balanced shafts and plugs that are displaced during normal operation of the valve. A balanced shaft or plug typically includes holes or apertures through its length to ensure that pressure forces are balanced on either side of the shaft or plug. This balancing of pressure forces significantly reduces the force required to actuate the valve, and more particularly the movement of the plug between its open and closed positions. These particular types of valves include a "balance seal" which extends about and is engageable to the plug to prevent upstream pressure from causing fluid to leak downstream of the plug. The balanced plugs are often located in a pipe or ducting system in order to control fluid flow by essentially blocking that flow to varying degrees. The plugs are themselves typically fabricated from sturdy blocks of metal and moved by rods into and out of the fluid flow. The balance seal normally acts against the side surface of the plug and, as indicated above, is placeable into sealed engagement with the plug to prevent upstream pressure from causing fluid to leak downstream of the plug.

In currently known balanced valves, the balance seal typically resides within a complementary channel or recess, and is often formed to include a portion which is deformed or deflected when exposed to pressure such that the deflected or deformed portion moves into sealed engagement with the valve plug. As such, the balance seal is often fabricated from a soft material to provide the requisite level of flexion/deformability. However, leakage problems arise when the valve including the balanced plug is used in certain applications. More particularly, in certain applications, a leakage path is defined between the balance seal and the walls of the complementary recess within the valve housing into which the balance seal is received, thus facilitating the undesirable leakage of upstream pressure downstream of the valve plug despite the sealed engagement of the deflected or deformed portion of the balance seal with the valve plug. This type of leakage problem often arises when the valve including the balance plug is used in cryogenic service applications wherein the temperature of the fluid flowing therethrough is about −50° Fahrenheit or below, with these extremely low temperatures facilitating shrinkage in the material of the balance seal which compromises its ability to maintain sealed contact with the valve housing. As indicated above, the insufficiency of the sealed engagement between the balance seal and the valve housing facilitates the undesirable leakage of upstream pressure downstream of the valve plug.

Such leakage may also occur as a result of the insufficiency of the sealed engagement between the balance seal and the valve plug itself, which also may occur in valves used in cryogenic service applications due to the balance seal not being configured to provide a level of flexion/deformability which is capable of maintaining sealed engagement to the valve plug despite the loss of softness/resiliency attributable to the extremely low fluid temperature. The present invention is adapted to overcome the above-described deficiencies by providing a combination face and plug seal which is adapted to prevent the aforementioned leakage problems typically encountered with existing balance seals.

BRIEF SUMMARY OF THE INVENTION

In accordance with a first embodiment of the present invention, there is provided a combination face and plug seal for use in a balanced pressure valve having a valve housing and a valve plug movable within the valve housing between an open position and a closed position. The seal comprises a main body portion having an engagement portion integrally connected thereto via an intermediate connection portion. The engagement portion includes a sealing surface which defines a central opening sized to accommodate the valve plug. A pair of primary springs extend along and at least partially between the main body and engagement portions in opposed relation to each other, with each of the primary springs defining a primary seal well. The seal of the first embodiment further comprises a pair of seal leg portions which are integrally connected to the main body portion in opposed relation to each other and each define an engagement surface. A pair of secondary springs extend along and at least partially between the main body portion and respective ones of the seal leg portions in opposed relation to each other, with the secondary springs each defining a secondary seal well. The main body, engagement and seal leg portions, as well as the primary and secondary springs, are each annular. The sealing surface defined by the engagement portion is preferably arcuately contoured (e.g., concave), with the engagement surface defined by each of the seal leg portions optionally including serrations formed therein.

The seal of the first embodiment is adapted to be retained within a complementary recess within the valve housing. The orientation of the valve plug in its closed position and/or the movement of the valve plug from its closed position toward its open position facilitates the forcing of the engagement portion into sealed engagement with the valve plug and the forcing of the seal leg portions into sealed engagement with the valve housing. In this regard, the engagement portion and primary springs are each deformable upon the application of pressure to the primary seal wells such that at least a portion of the sealing surface is forced into sealed engagement with the valve plug. Similarly, the seal leg portions and secondary springs are each deformable upon the application of pressure to the secondary seal wells such that at least a portion of the engagement surface of each of the seal leg portions is forced into sealed engagement with the valve housing. The main body, engagement and seal leg portions of the seal are each preferably fabricated from virgin polytetrafluoroethylene, with the primary and secondary springs each preferably being fabricated from a resilient metallic material.

In accordance with a second embodiment of the present invention, there is provided a seal configured as essentially one-half the seal of the first embodiment. In this regard, the seal of the second embodiment includes only one seal leg portion, only one primary spring and only one secondary spring, with the primary and secondary springs being disposed on a common side of the remainder of the seal.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
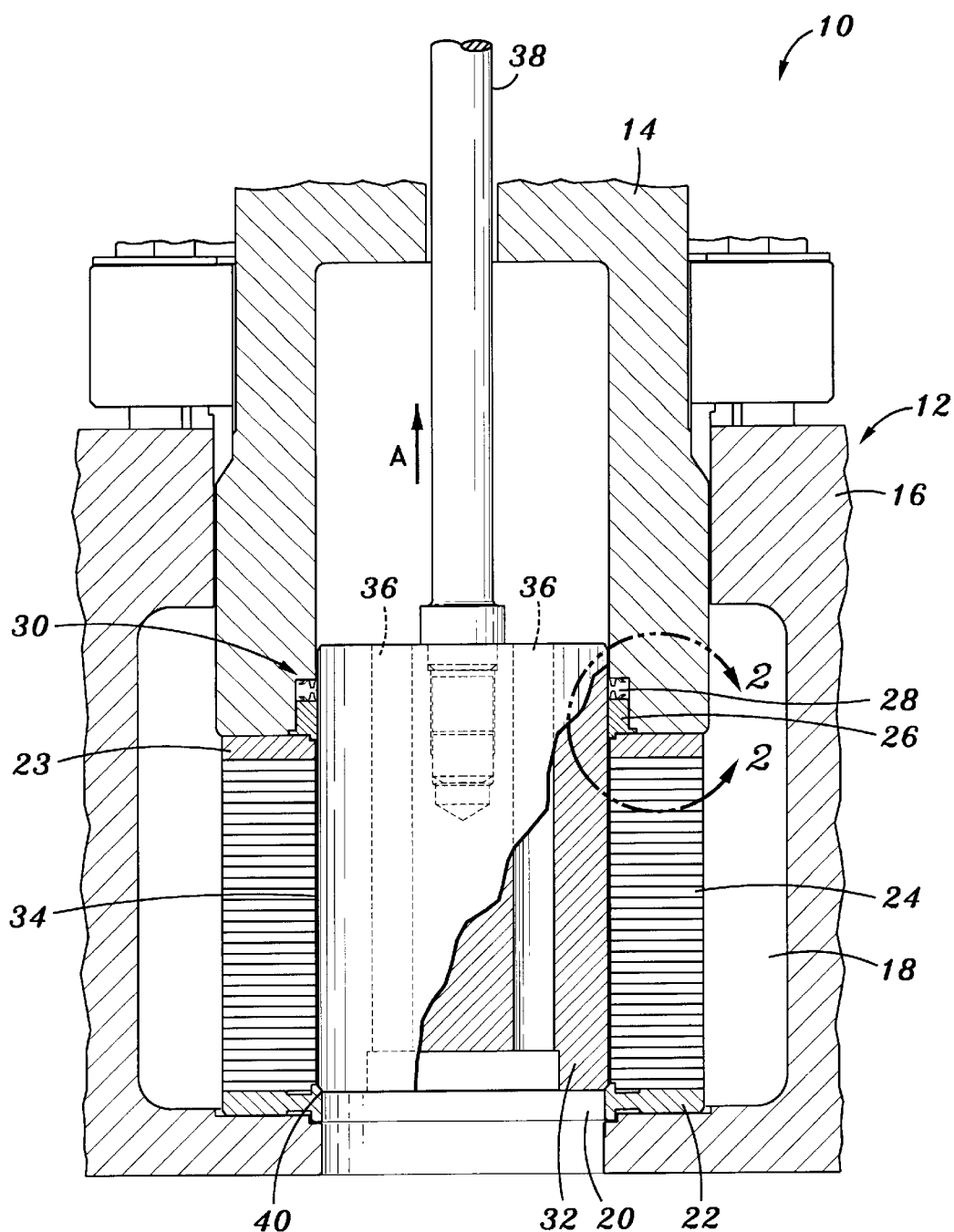
FIG. 1 is a partial cross-sectional view of a valve arrangement including the face and plug seal constructed in accordance with a first embodiment of the present invention.

Referring now to the drawings wherein the showings are for purposes of illustrating preferred embodiments of the present invention only, and not for purposes of limiting the same, FIG. 1 illustrates an exemplary valve arrangement 10 which includes the combination face and plug seal constructed in accordance with the present invention, the structural and functional attributes of which will be discussed in more detail below. The valve arrangement 10 comprises a valve housing 12 which includes an upper section 14 and a lower section 16 which collectively define an interior chamber 18. The lower section 16 also defines an inflow opening 20 which fluidly communicates with the interior chamber 18.

The valve housing 12 further comprises an annular seat ring 22 which is cooperatively engaged to the lower section 16 and at least partially disposed within the inflow opening 20, and an annular bushing 23 which is engaged to one end of the upper section 14. Operatively captured between the seat ring 22 and the bushing 23 is a valve cage 24 of the valve housing 12. The valve cage 24 resides within the interior chamber 18. The valve housing 12 also includes an annular retainer ring 26 which is cooperatively engaged to one side of the bushing 23 and a corresponding end portion of the upper section 14. The retainer ring 26 and the upper section 14 collectively define an annular recess 28 within the valve housing 12 which communicates with the interior chamber 18. Disposed within the recess 28 of the valve housing 12 is the combination face and plug seal 30 constructed in accordance with a first embodiment of the present invention.

In addition to the valve housing 12, the valve arrangement 10 includes a generally cylindrical valve plug 32 which defines an outer surface 34. The valve plug 32 is fabricated from a metal material, and defines one or more flow holes or apertures 36 which extend through the length thereof, and are used for purposes which will also be described in more detail below. Attached to and extending axially from one end of the valve plug 32 is an elongate shaft or rod 38 which is advanced through a complementary bore disposed within the upper section 14 of the valve housing 12. The end of the valve plug 32 opposite that including the rod 38 extending therefrom defines a seating rim 40.

In the valve arrangement 10, the rod 38 is operatively coupled to an actuator (not shown) which is adapted to reciprocally move the valve plug 32 between a closed position (shown in FIG. 1) and an open position. The actuator may comprise any type of actuator (e.g., piston, air diaphragm, electric, hydraulic). The movement of the valve plug 32 to the open position occurs as a result of the movement of the rod 38 in the direction shown by the arrow A in FIG. 1. As will be recognized, upon the movement of the valve plug 32 to its open position, the same may be selectively returned to its closed position by the movement of the rod 38 in a direction opposite to the direction designated by the arrow A. When the valve plug 32 is in its closed position, the seating rim 40 defined thereby is seated against a complementary engagement surface defined by the seat ring 22. The engagement of the valve plug 32 to the seat ring 22 effectively blocks the flow of fluid into the interior of the valve cage 24. However, the fluid is able to flow through the valve plug 32 via the flow apertures 36 into that region of the interior chamber 18 which is bounded by the upper section 14 of the valve housing 12 and top end of the valve plug 32.

When the valve plug 32 in the valve arrangement 10 is moved from its closed position toward its open position, fluid is able to flow through the valve cage 24 from the interior to the exterior thereof. Upon flowing from the exterior of the valve cage 24, the fluid (which undergoes a pressure drop as a result of flow through the valve cage 24) enters that portion of the interior chamber 18 defined between the valve cage 24 and the lower section 18 of the valve housing 12. Such reduced pressure fluid flows into an outflow opening (not shown) which fluidly communicates with the interior chamber 18. As the high pressure fluid flows into the interior of the valve cage 24 attributable to the movement of the valve plug 32 from its closed position toward its open position, such high pressure fluid is also applied to the seal 30.

Figure 2:
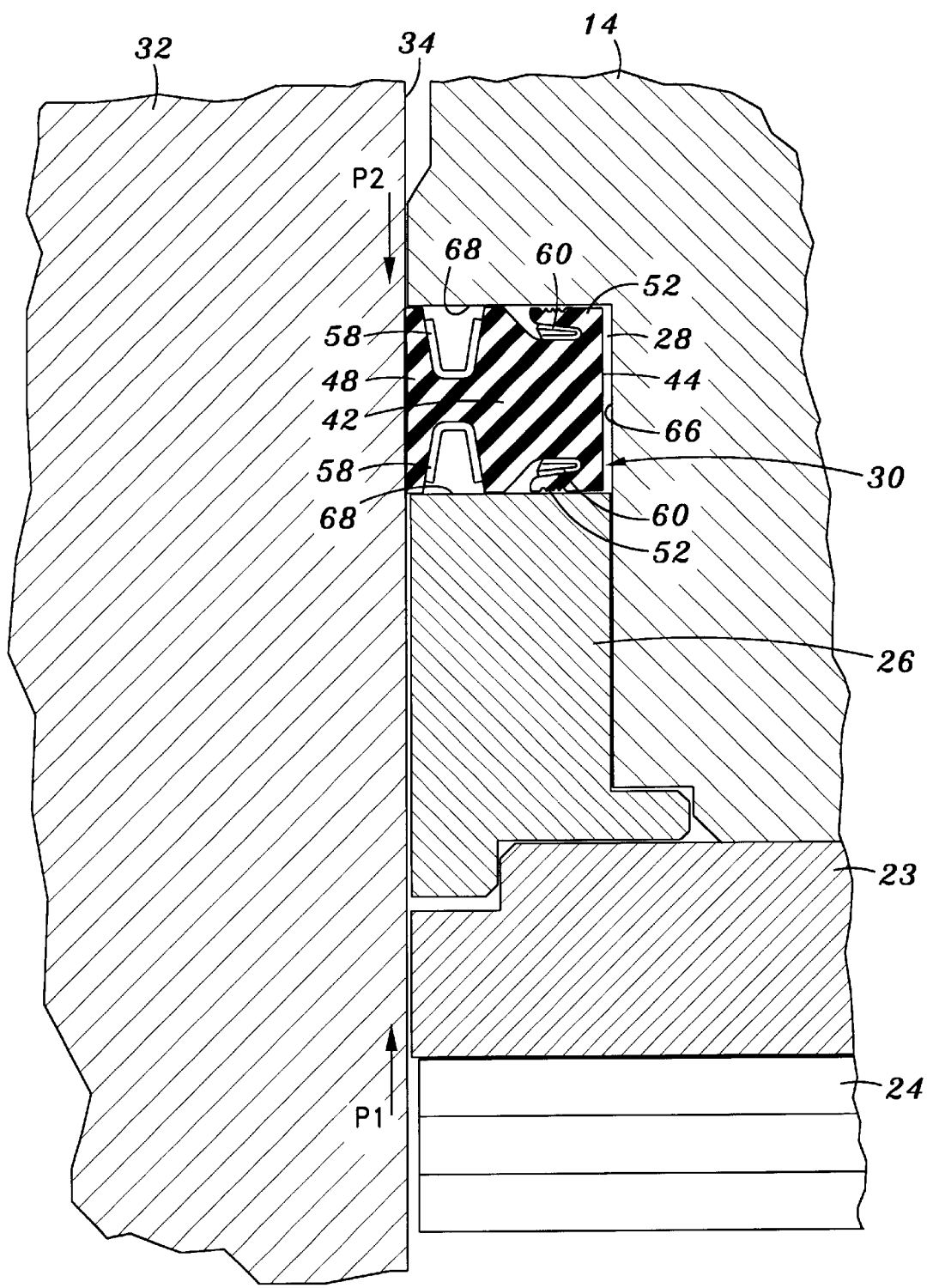
FIG. 2 is an enlargement of the encircled region 2 shown in FIG. 1.
Figure 3:
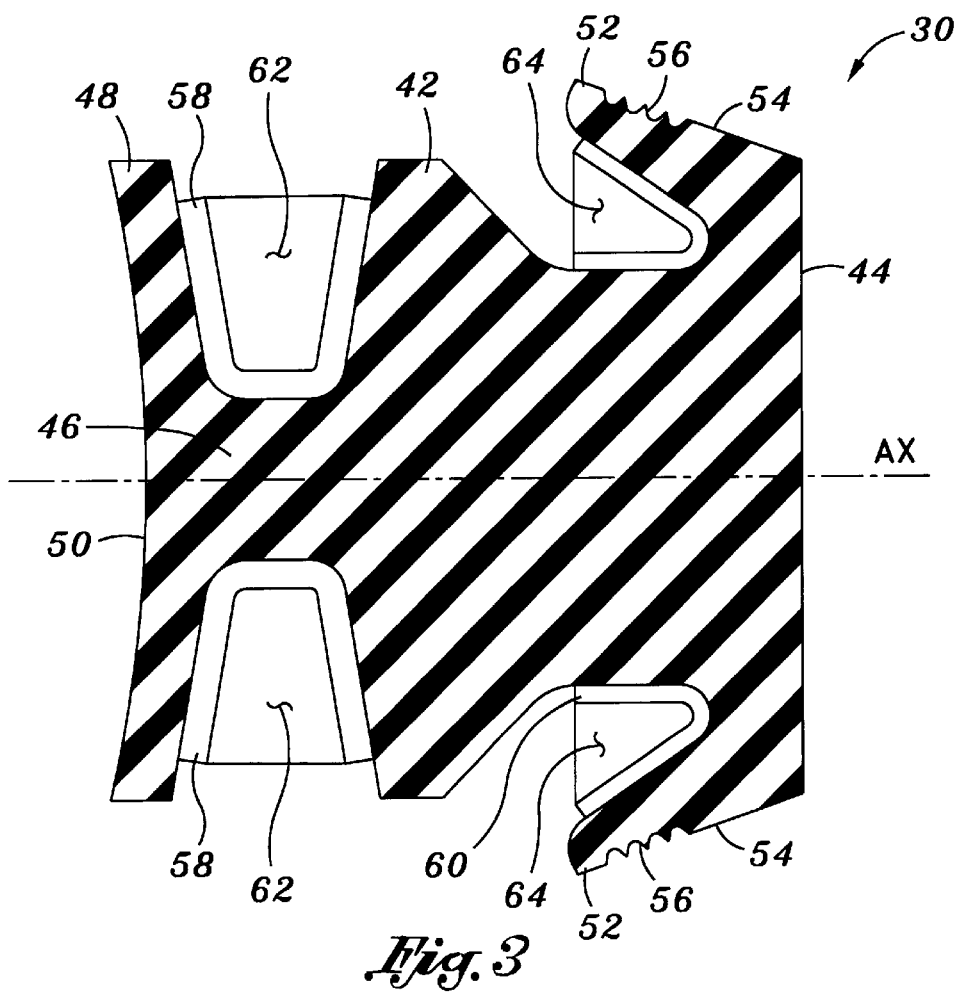
FIG. 3 is an enlarged cross-sectional view of the combination face and plug seal of the first embodiment as shown in FIGS. 1 and 2.

As best seen in FIGS. 2 and 3, the seal 30 of the first embodiment is annular, and includes a main body 42 which defines a back surface 44. Integrally connected to and protruding from that end of the main body 42 disposed in opposed relation to the back surface 44 is a reduced width connection portion 46 which transitions into an enlarged engagement portion 48. The engagement portion 48 defines an arcuately contoured, generally concave sealing surface 50. The engagement portion 48, and in particular the sealing surface 50 thereof, defines a circularly configured opening which is sized to accommodate the valve plug 32.

The seal 30 is further formed to define an opposed pair of seal legs 52 which are integrally connected to the main body 42 and extend to the back surface 44 thereof. The seal legs 52, which are identically configured, each define an engagement surface 54 which extends angularly relative to the back surface 44. The engagement surface 54 of each seal leg 52 may optionally be formed to include serrations 56 within a portion thereof.

The seal 30 further comprises a pair of identically configured primary springs 58 which are disposed in opposed relation to each other and each have a generally U-shaped cross-sectional configuration. More particularly, the primary springs 58 are oriented such that the center sections thereof directly contact respective ones of the opposed sides of the connection portion 46 of the seal 30, with the end sections of each primary spring 58 extending along respective ones of the engagement portion 48 and main body 42.

In addition to the primary springs 58, the seal 30 includes an identically configured pair of secondary springs 60 which each have a generally V-shaped cross-sectional configuration. Each of the secondary springs 60 directly contacts and extends along the main body 42 and a respective one of the seal legs 52. In the seal 30, each of the primary springs 58 defines an annular primary seal well 62. Similarly, each of the secondary springs 60 defines an annular secondary seal well 64. The primary and secondary springs 58, 60 are each preferably fabricated from a flexible/resilient metallic material. The remainder of the seal 30 (e.g., the main body 42, connection portion 46, engagement portion 48 and seal legs 52) is preferably fabricated from a soft, deformable material such as virgin polytetrafluorethylene.

As best seen in FIGS. 1 and 2, the recess 28 of the valve housing 12 into which the seal 30 is received has a generally square or rectangular cross-sectional configuration defining a back wall 66 and an opposed pair of side walls 68. As indicated above, the recess 28 is collectively defined by the upper section 14 and retainer ring 26 of the valve housing 12. In this regard, the back wall 66 and one of the side walls 68 of the recess 28 is defined by the upper section 14, with the remaining side wall 68 being defined by the retainer ring 26.

When the seal 30 is inserted into the recess 28, a slight, narrow gap is typically defined between the back surface 44 of the main body 42 and the back wall 66. The seal legs 52, and in particular the engagement surfaces 54 thereof, are brought into sealed contact with respective ones of the side walls 68. In this regard, the advancement of the seal 30 into the recess 28 facilitates a compression of the seal legs 52 and hence the secondary springs 60 as causes the engagement surfaces 54 of the seal legs 52 to extend along respective ones of the side walls 68 at about a ninety degree angle relative to the back surface 44. The outward biasing force exerted by the compressed secondary springs 60 against the seal legs 52 assists in maintaining sealed engagement between the engagement surfaces 54 and side walls 68, with such sealed engagement being enhanced by the flow of high pressure fluid into the secondary seal wells 64 as will be discussed in more detail below.

When the valve plug 32 is moved from its closed position toward its open position causing fluid to flow into the interior of the valve cage 24, the high pressure fluid also flows in the direction shown by the arrow P1 in FIG. 2 between the inner surface of the retainer ring 26 and the outer surface 34 of the valve plug 32 into the recess 28. The flow of the high pressure fluid into the recess 28 results in the same flowing into the primary and secondary seal wells 62, 64 defined by the primary and secondary springs 58, 60 disposed closest to the retainer ring 26. For purposes of clarity, the primary and secondary springs 58, 60 disposed closest to the retainer ring 26 will be referred to as the "lower" primary and secondary springs 58, 60, with the primary and secondary springs 58, 60 disposed closest to the side wall 68 defined by the upper section 14 being referred to as the "upper" primary and secondary springs 58, 60.

The flow of high pressure fluid into the primary seal well 62 defined by the lower primary spring 58 facilitates the outward biasing of that section of the engagement portion 48 extending along the lower primary spring 58 into sealed engagement with the outer surface 34 of the valve plug 32. The sealed contact between the sealing surface 50 of the engagement portion 48 and the outer surface 34 of the valve plug 32 is assisted by the outward biasing force exerted by the lower primary spring 58 against the engagement portion 48. In this regard, as seen in FIG. 2, the normal contact between the valve plug 32 and the seal 30 results in a slight compression of the primary springs 58 and a "flattening" of the sealing surface 50 of the engagement portion 48 which, as indicated above, is formed to have an arcuate or concave configuration.

In addition to the high pressure fluid flowing into the primary seal well 62 of the lower primary spring 58, the high pressure fluid also flows along the side wall 68 defined by the retainer ring 26 into the secondary seal well 64 defined by the lower secondary spring 60. The high pressure fluid within the secondary seal well 64 of the lower secondary spring 60 biases the corresponding seal leg outwardly, thus enhancing the integrity of the sealed contact between the engagement surface 54 thereof and the corresponding side wall 68. As indicated above, such sealed contact is initially facilitated by the outward biasing force exerted against the seal legs 52 by the secondary springs 60 which are compressed upon the advancement of the seal 30 into the recess 28.

As indicated above and as seen in FIG. 1, when the valve plug 32 is in its closed position, the high pressure fluid still flows through the flow apertures 36 thereof and into the interior of that portion of the interior chamber 18 which is bounded by the upper section 14 of the valve housing 12. The high pressure fluid is able to flow between the outer surface 34 of the valve plug 32 and the inner surface of the upper section 14 in the direction shown by the arrow P2 in FIG. 2 to the recess 28 and hence the seal 30. The high pressure fluid flows into the recess 28 along the side wall 68 defined by the upper section 14, and thus flows into the primary and secondary seal well 62, 64 of the upper primary and secondary springs 58, 60, respectively. The flow of high pressure fluid into the primary seal well 62 defined by the upper primary spring 58 enhances the integrity of the sealed contact between that section of the engagement portion 48 extending along the upper primary spring 58 and the valve plug 32 in the same manner described above with respect to the lower primary spring 58. Similarly, the flow of the high pressure fluid into the secondary seal well 64 defined by the upper secondary spring 60 enhances the integrity of the sealed contact between the corresponding seal leg 52 and the side wall 68 defined by the upper section 14 of the valve housing 12 in the same manner described above in relation to the lower secondary spring 60.

The sealed contact between the sealing surface 50 of the engagement portion 48 and the outer surface 34 of the valve plug 32 prevents the leakage of any high pressure fluid therebetween to the interior of the valve cage 24. The "balance" of pressure on each side of the seal created between the engagement portion 48 of the seal 30 and the valve plug 32 significantly reduces the force required to facilitate the movement of the valve plug 32 to its fully open position and thereafter back to its closed position. Additionally, the sealed contact between the engagement surfaces 54 of the seal legs 52 and the side walls 68 of the recess 28 prevents leakage of the high pressure fluid along the side wall 68 defined by the upper section 14, through the gap along the back wall 66, along the side wall 68 defined by the retaining ring 26, and between the valve plug 32 and retainer ring 26 to the interior of the valve cage 24.

Thus, the particular structural and functional attributes of the seal 30 facilitate the formation of a sliding seal between the sealing surface 50 of the engagement portion 48 and the outer surface 34 of the valve plug 32. Such sliding seal is maintained as the valve plug 32 moves from its closed position to its fully open position and thereafter back to its closed position by the outward biasing force exerted by the primary springs 58 against the engagement portion 48 in concert with the outward biasing force exerted by the flow of high pressure fluid into the primary seal wells 62 defined by the primary springs 58. The sealed contact between the engagement surfaces 54 of the seal legs 52 and side walls 68 of the recess 28 are static seals which are maintained by the outward biasing force exerted by the secondary spring 60 against the seal legs 52 in concert with the flow of high pressure fluid into the secondary seal wells 64 defined by the secondary springs 60. In the absence of the seal legs 52, high pressure fluid flowing to the seal 30 from the direction P2 would be capable of flowing through the recess 28 along the side walls 68 and back wall 66, and thus past any seal between the engagement portion 48 and valve plug 32, thus potentially causing undesirable leakage of upstream pressure downstream of the valve plug 32.

As indicated above, each of the seal legs 52 may be formed to include the serrations 56. The serrations 56 are adapted to assist in preventing any "slippage" of the seal 30 within the recess 28. However, the engagement surfaces 54 of the seal legs 52 need not include the serrations 56 formed therein, but rather may have smooth, generally planar configurations. In this regard, slippage of the seal 30 within the recess 28 could be prevented by the formation of serrations within each of the side walls 68 at a location whereat such serrations come into contact with portions of the engagement surfaces 54. However, if such serrations are formed within the side walls 68, the locations thereof would need to be such that they do not compromise the integrity of the seal created between the engagement surfaces 54 of the seal legs 52 and the side walls 68.

Figure 4:
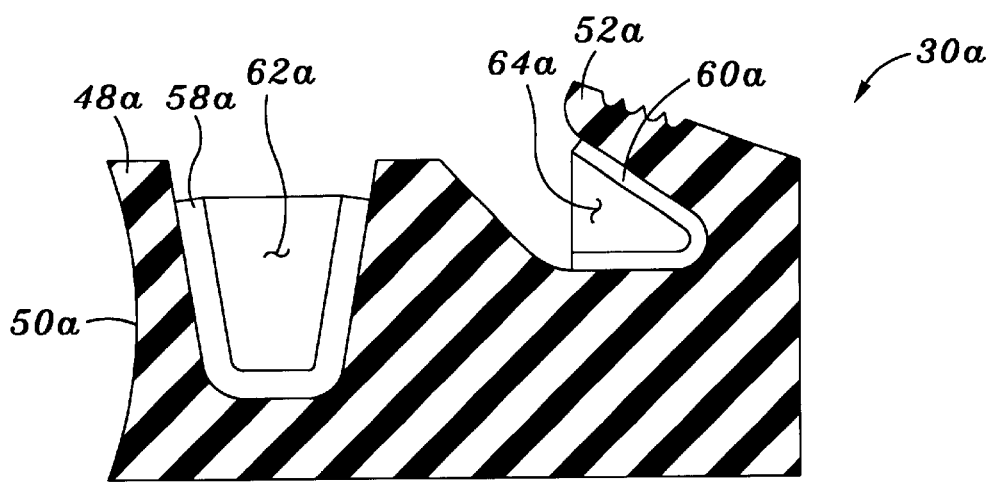
FIG. 4 is a cross-sectional view of a combination face and plug seal constructed in accordance with a second embodiment of the present invention.

Referring now to FIG. 4, there is shown a seal 30*a* which is constructed in accordance with a second embodiment of the present invention. The seal 30*a* of the second embodiment is essentially formed as one-half the seal 30 constructed in accordance with the first embodiment. Stated another way, the form of the seal 30*a* is essentially that which would be derived by cutting the seal 30 along the axis AX shown in FIG. 3. Thus, the seal 30*a* includes only one primary spring 58*a* and only one secondary spring 60*a* (corresponding to only one seal leg 52*a*). However, as seen in FIG. 4, the sealing surface 50*a* of the engagement portion 48*a* may be formed to have a concave configuration.

The alternative configuration of the seal 30*a* shown in FIG. 4 is suitable in certain applications since the above-described functionality as discussed in relation to the seal 30 may be achievable with only the single primary spring 58*a* and the single secondary spring 60*a*. In this respect, the seal 30*a* could be oriented within the recess 28 such that the sole primary and secondary springs 58*a*, 60*a* are positioned adjacent the side wall 68 defined by the upper section 14 of the valve housing 12. In this orientation, the flow of high pressure fluid to the seal 30*a* from the direction P2 would facilitate flow into the primary and secondary seal wells 62*a*, 64*a* defined by the primary and secondary springs 58*a*, 60*a* as would result in the creation of sliding and static seals in the same manner described above in relation to the upper primary and secondary springs 58, 60 in the seal 30. Similarly, if the seal 30*a* were oriented within the recess 28 such that the sole primary and secondary springs 58*a*, 60*a* were disposed adjacent the side wall 68 defined by the retainer ring 26, the flow of high pressure fluid to the seal 30*a* from the direction P1 would facilitate flow into the primary and secondary seal wells 62*a*, 64*a* in a manner facilitating the creation of sliding and static seals in the same manner described above in relation to the lower primary and secondary springs 58, 60 in the seal 30. Thus, depending on the specific application for the valve arrangement 10, the seal 30*a* of the second embodiment could be used as an alternative to the seal 30. It will be recognized that when the seal 30*a* is to be employed in the valve arrangement 10, the recess 28 will be formed to have a size which is complementary to that of the seal 30*a*.

Additional modifications and improvements of the present invention may also be apparent to those of ordinary skill in the art. For example, the seal 30 of the first embodiment and/or the seal 30*a* of the second embodiment could each exclude the primary and secondary springs 58, 58*a*, 60, 60*a*, with the various sliding and static seals being created solely as a result of the flow of high pressure fluid into the primary and secondary seal wells 62, 62*a*, 64, 64*a* and the resultant outward flexion/deformation of the engagement portion 48, 48*a* and seal legs 52, 52*a*. Thus, the particular combination of parts described and illustrated herein is intended to represent only certain embodiments of the present invention, and is not intended to serve as limitations of alternative devices within the spirit and scope of the invention.

What is claimed is:

1. A combination face and plug seal for use in a balanced pressure valve having a valve housing and a valve plug moveable within the valve housing between an open position and a closed position, the seal comprising:

a main body portion;

an engagement portion integrally connected to the main body portion;

at least one primary spring extending along and at least partially between the main body and engagement portions;

at least one seal leg portion integrally connected to the main body portion; and at least one secondary spring extending along and at least partially between the main body and seal leg portions;

the seal being adapted to be retained within the valve housing, with the engagement portion being forced into sealed engagement with the valve plug and the seal leg portion being forced into sealed engagement with the valve housing when the valve plug is in the closed position.

2. The seal of claim 1 wherein:

the main body, engagement and seal leg portions, and the primary and secondary springs, are each annular;

the engagement portion includes a sealing surface which defines a central opening sized to accommodate the valve plug;

the seal leg portion includes an engagement surface;

the primary spring defines a primary seal well; and the secondary spring defines a secondary seal well;

the engagement portion and primary spring each being deformable upon the application of pressure to the primary seal well such that at least a portion of the sealing surface is forced into sealed engagement with the valve plug, with the seal leg portion and secondary spring each being deformable upon the application of pressure to the secondary seal well such that at least a portion of the engagement surface is forced into sealed engagement with the valve housing.

3. The seal of claim 2 further comprising an annular connection portion integrally connected to and extending between the main body and engagement portions.

4. The seal of claim 2 wherein the sealing surface has an arcuate configuration.

5. The seal of claim 2 wherein the engagement surface includes serrations formed therein.

6. The seal of claim 2 wherein:

a pair of primary springs extend along and at least partially between the main body and engagement portions in opposed relation to each other, the primary springs each defining a primary seal well;

a pair of seal leg portions are integrally connected to the main body portion in opposed relation to each other, the seal leg portions each defining an engagement surface; and a pair of secondary springs extend along and at least partially between the main body portion and respective ones of the seal leg portions in opposed relation to each other, the secondary springs each defining a secondary seal well.

7. The seal of claim 6 wherein the sealing surface has a concave configuration.

8. The seal of claim 6 wherein the engagement surface of each of the seal leg portions includes serrations formed therein.

9. The seal of claim 1 wherein the main body, engagement and seal leg portions of the seal are fabricated from virgin polytetrafluorethylene.

10. The seal of claim 1 wherein the primary and secondary springs are each fabricated from a resilient metallic material.

11. A balanced pressure valve, comprising:
   a valve housing;
   a valve plug movable within the valve housing between an open position and a closed position; and
   a combination face and plug seal retained within the valve housing and comprising:
      a main body portion;
      an engagement portion integrally connected to the main body portion;
      at least one primary spring extending along and at least partially between the main body and engagement portions;
      at least one seal leg portion integrally connected to the main body portion; and
      at least one secondary spring extending along and at least partially between the main body and seal leg portions;
   the engagement portion being forced into sealed engagement with the valve plug and the seal leg portion being forced into sealed engagement with the valve housing when the valve plug is in the closed position.

12. The valve of claim 11 wherein:
   the main body, engagement and seal leg portions, and the primary and secondary springs, are each annular;
   the engagement portion includes a sealing surface which defines a central opening sized to accommodate the valve plug;
   the seal leg portion includes an engagement surface;
   the primary spring defines a primary seal well; and
   the secondary spring defines a secondary seal well;
   the engagement portion and primary spring each being deformable upon the application of pressure to the primary seal well such that at least a portion of the sealing surface is forced into sealed engagement with the valve plug, with the seal leg portion and secondary spring each being deformable upon the application of pressure to the secondary seal well such that at least a portion of the engagement surface is forced into sealed engagement with the valve housing.

13. The valve of claim 12 wherein the seal further comprises an annular connection portion integrally connected to and extending between the main body and engagement portions.

14. The valve of claim 12 wherein the sealing surface of the engagement portion of the seal has an arcuate configuration.

15. The valve of claim 12 wherein the engagement surface of the seal leg portion includes serrations formed therein.

16. The valve of claim 12 wherein:
   a pair of primary springs extend along and at least partially between the main body and engagement portions of the seal in opposed relation to each other, the primary springs each defining a primary seal well;
   a pair of seal leg portions are integrally connected to the main body portion of the seal in opposed relation to each other, the seal leg portions each defining an engagement surface; and
   a pair of secondary springs extend along and at least partially between the main body portion and respective ones of the seal leg portions of the seal in opposed relation to each other, the secondary springs each defining a secondary seal well.

17. The valve of claim 16 wherein the sealing surface of the engagement portion has a concave configuration.

18. The valve of claim 16 wherein the engagement surface of each of the seal leg portions of the seal include serrations formed therein.

19. The valve of claim 11 wherein the main body, engagement and seal leg portions of the seal are fabricated from virgin polytetrafluorethylene.

20. The valve of claim 11 wherein the primary and secondary springs of the seal are each fabricated from a resilient metallic material.

* * * * *